H. W. DENHARD.
ELECTRIC WATER HEATER.
APPLICATION FILED JUNE 25, 1908.
927,027.
Patented July 6, 1909.
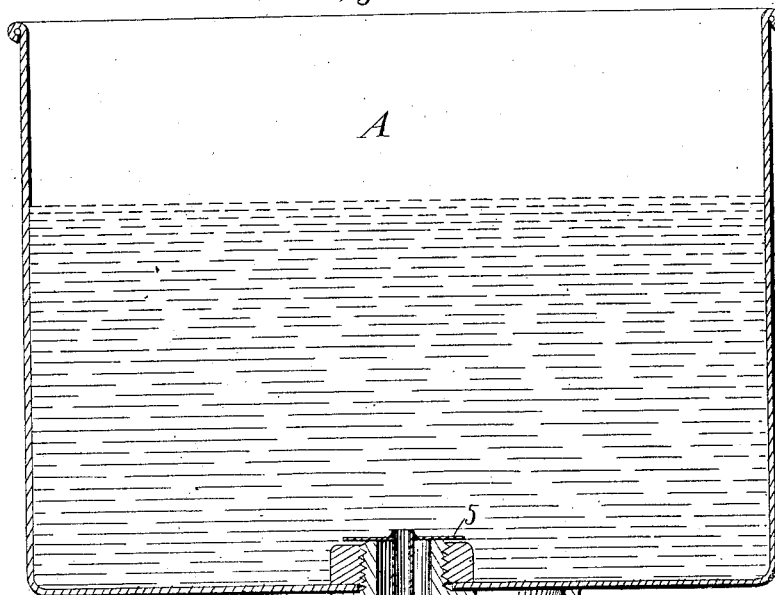
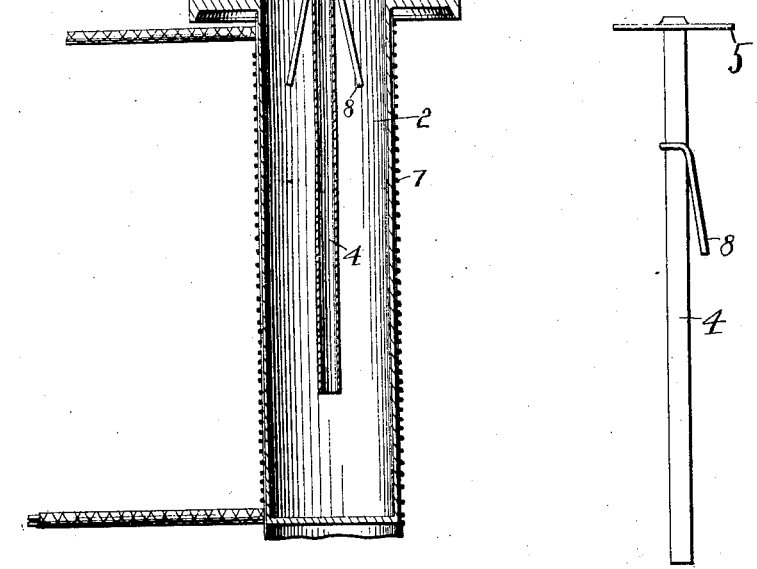

UNITED STATES PATENT OFFICE.

HARRY W. DENHARD, OF SAN FRANCISCO, CALIFORNIA, ASSIGNOR TO GEORGE B. KATZENSTEIN, JR., OF SAN FRANCISCO, CALIFORNIA.

ELECTRIC WATER-HEATER.

No. 927,027.    Specification of Letters Patent.    Patented July 6, 1909.

Application filed June 25, 1908. Serial No. 440,372.

*To all whom it may concern:*

Be it known that I, HARRY W. DENHARD, a citizen of the United States, residing at San Francisco, in the county of San Francisco, State of California, have invented certain new and useful Improvements in Electric Water-Heaters, of which the following is a specification.

My invention is designed as an improvement on Letters Patent #852,854, dated May 7, 1907. The device shown in this patent is an electrical fluid heater and includes a water receptacle with a tubular extension in the bottom, electrically heated by a coil surrounding the extension, and in order to secure a circulation through the electrical heater, of the water in the fluid chamber, a central tube is provided, having openings at the bottom so that the water passes downwardly through the tube and out into the space around the central tube formed by the outer heating tube, and upwardly into the body of water.

In the present construction I have aimed to simplify and cheapen the device of the patent without impairing its efficiency, and I have succeeded in doing this by changing the form of the inner feed tube of the patent referred to, making this a readily detachable tube of relatively small diameter and having a deflecting disk extending over the end of the outer tube or heating chamber so that the feed water passes down through the opening of the inner tube into the heating chamber and upwardly under the edges of the disk into the reservoir. The upward movement of the tube with its disk is limited as hereinafter more fully described.

In the accompanying drawing Figure 1 shows a sectional view of the invention. Fig. 2 is a detail.

The water or liquid chamber is shown at A and the electrical heating attachment is practically the same as that shown in the aforesaid patent, being of tubular form and having a watertight connection with the bottom of the reservoir. The external periphery of the chamber is covered with an insulating material such as mica, and coiled about the insulation are the wires 7. The electrical connections are made in the usual way and may be as described in the patent.

The heating tube or chamber 2 has a reduced upper end opening into the reservoir A, and in this present construction of the device I modify slightly the form of the tube 4 of Patent 852,854. Instead of using a tube of relatively large diameter I substitute a tube of small diameter, this tube being open at the top and bottom, the tube being indicated at 4, and at its upper end it carries a disk of sheet metal 5 through a hole in the center of which the tube passes, extending slightly above the upper surface thereof. This disk is larger in diameter than the opening from the heating chamber 2, so as to provide for a proper circulation, the feed water passing down through the tube into the heating chamber, and as it becomes heated the water passes upwardly under the edge of the disk. The tube with its disk is allowed a certain free movement so as to prevent the formation of pressure within the heating chamber, as by the generation of steam, and yet the construction is such as to prevent the disk and tube from being detached from its connection with the heating chamber except when this is done forcibly and manually for cleaning or other purposes. This is accomplished by securing to the tube 4 bent arms of spring wire 8, which normally are expanded beyond the diameter of the outlet from the heating chamber. These arms are pressed inwardly and forced through the reduced outlet of the heating chamber as the tube 4 is put in place, and the arms expanding in the heating chamber offers a resistance to the displacement of the tube with its disk as soon as it is lifted to a position where the spring arms come in contact with the walls of the outlet, which, as has been stated, is of less diameter than the heating diameter proper. The spring-arms are however, located a distance below the top of the tube 4 so as to permit a sufficient free movement of the disk to allow the free discharge of the hot water and to prevent the formation of any considerable pressure. In the drawing, while the tank is shown with the water therein, for clearness of illustration the water is not shown as filling the heating chamber.

What I claim is:—

1. A fluid heating apparatus consisting of a reservoir an electrically heated, extension of the reservoir and a feed tube carrying a deflector device for the hot water, substantially as described.

2. In an electrical heater, the heating chamber having a discharge opening and a feed tube extending into the chamber with means for deflecting the rising current from the descending current and thus providing for proper circulation, substantially as described.

3. In an electrical heater, a heating chamber 2, a feed tube 4 and a deflector carried by the feed tube, substantially as described.

4. In an electrical heater, a heating chamber 2, a feed tube, a deflecting disk carried thereby and means for limiting the upward movement of the disk, substantially as described.

5. In an electrical heater, a heating chamber 2, a feed tube, a deflector carried thereby, said tube and deflector being removable from the heating chamber, substantially as described.

In testimony whereof I have affixed my signature in the presence of two witnesses this 11th day of March, 1908.

HARRY W. DENHARD.

Witnesses:
FRANK L. OWEN,
FLORA M. BARTEL.